(12) United States Patent
Muto et al.

(10) Patent No.: US 6,475,625 B2
(45) Date of Patent: Nov. 5, 2002

(54) PLASTIC PARTS JOINING STRUCTURE

(75) Inventors: Nobuharu Muto, Sashima-gun (JP); Hiroshi Osaki, Sashima-gun (JP)

(73) Assignee: Kyosan Denki Co., Ltd., Sashima-Gun (JP)

( * ) Notice: Subject to any disclaimer, the term of this patent is extended or adjusted under 35 U.S.C. 154(b) by 0 days.

(21) Appl. No.: 09/825,844

(22) Filed: Apr. 5, 2001

(65) Prior Publication Data

US 2001/0028939 A1 Oct. 11, 2001

(30) Foreign Application Priority Data

Apr. 7, 2000 (JP) .......................................... 2000-106957

(51) Int. Cl.⁷ ............................. B32B 27/00; F16L 9/00; F16L 21/00; C08J 5/12; B60K 15/01
(52) U.S. Cl. ................ 428/423.5; 428/35.7; 428/423.1; 428/423.7; 428/424.8; 428/474.4; 428/475.2; 428/476.1; 138/109; 138/155; 138/163; 138/DIG. 7; 285/3; 285/31; 285/405
(58) Field of Search ................................. 428/35.7, 423, 428/423.5, 423.7, 424.8, 476.1, 475.2; 138/109, 155, 163, DIG. 7; 285/3, 31, 405

(56) References Cited

U.S. PATENT DOCUMENTS

| 5,384,172 | A | * | 1/1995 | Takado et al. ............. 428/35.7 |
| 5,424,020 | A | | 6/1995 | Hara et al. ................... 264/257 |
| 5,443,098 | A | | 8/1995 | Kertesz ....................... 138/109 |

FOREIGN PATENT DOCUMENTS

| DE | 35 24 881 A1 | | 1/1987 |
| DE | 195 35 413 C1 | | 10/1996 |
| EP | 0 626 256 A1 | | 11/1994 |
| EP | 1 142 935 A2 | * | 10/2001 |
| JP | 10-071861 A | | 3/1998 |

* cited by examiner

Primary Examiner—P. Hampton-Hightower
(74) Attorney, Agent, or Firm—Oliff & Berridge, PLC

(57) ABSTRACT

In a structure for joining a first plastic part and a second plastic part, the first plastic part is composed of at least one resin such as polyamide (PA), polybutylene terephthalate (PBT), polyacetal (POM), polyethylene terephthalate (PET), or polyphenylene sulfide (PPS), while the second plastic part is composed of high-density polyethylene (HDPE). Between the two parts, a metamorphic polyethylene layer exhibiting a good joining property for both the first and second plastic parts is interposed to join the parts.

3 Claims, 6 Drawing Sheets

PLASTIC PARTS JOINING STRUCTURE

The disclosures of Japanese Patent Application No. 2000-106957 filed on Apr. 7, 2000 including the specification, drawings and abstract is incorporated herein by reference in its entirety.

BACKGROUND OF THE INVENTION

1. Field of the Invention

The invention relates to a structure for joining thermoplastic resin parts to each other.

2. Description of Related Art

In a fuel supply system of an automobile, making various parts out of plastic has been proposed for weight reduction. Since within a fuel supply system a fuel tank is a relatively large part, the use of plastic for this part largely contributes to weight reduction of the vehicle. Thus, in recent years, many different plastic fuel tanks have been implemented.

When a plastic fuel tank is used, it is difficult to mount different members such as a fuel cut valve and onboard refueling vapor recovery (ORVR) valve to be connected to the fuel tank. When joining plastic parts, fusing is normally employed, but joining by fusing can be difficult depending on the type of resin, making it difficult to improve airtightness or prevent the member from coming off.

For example, Japanese Patent Application Laid-Open Publication No. HEI 10-71861 discloses related art which is a mounting structure for a fuel cutoff valve to a plastic fuel tank. The mounting structure of the related art is described hereafter with reference to FIG. 6.

A skin layer of a fuel tank 1 is composed of high-density polyethylene (HDPE) from the viewpoint of strength and durability. On the other hand, a fuel cutoff valve 2 is composed of polyacetal (POM). The difference in materials employed for the fuel tank 1 and the fuel cutoff valve 2 leads to problems in fusing due to the difference in melting points of the respective materials. Consequently, joining the members stably for an extended period of time is difficult.

To solve this problem, in this structure, the fuel cutoff valve 2 is joined to a high-density polyethylene (HDPE) fuel cutoff valve mounting member 3 by insert molding (joining) first, and then the fuel cutoff valve mounting member 3 in which the fuel cutoff valve 2 is insert-molded is joined to the fuel tank 1.

As another example, Japanese Patent No. 2715870 discloses another related art which is a pipe joining structure which is described with reference to FIG. 7.

A pipe 11 on one side is composed of high-density polyethylene (HDPE) corresponding to the material of a tank. On the other hand, a pipe 12 on another side is composed of polyamide (PA). This polyamide resin does not exhibit a good joining property with high-density polyethylene so it is difficult to fuse these materials directly.

Therefore, the pipe 11 on the one side composed of high-density polyethylene (HDPE) is insert molded (joined) with the portion 13 of the pipe 12 on the other side.

According to the aforementioned related arts for a joining structure for plastic parts, however, there have been problems such as the following.

First, a resin such as high-density polyethylene (HDPE) does not exhibit an excellent joining property with other resins such as polyamide (PA), polybutylene terephthalate (PBT), polyacetal (POM), polyethylene terephthalate (PET), or polyphenylene sulfide (PPS) so it is difficult to maintain a joined state and airtightness over an extended period of time.

SUMMARY OF THE INVENTION

Therefore, it is an object of the invention to provide a joining structure in which the joining structure of plastic parts is improved so that the joined state is maintained as well as airtightness for an extended period of time.

In order to achieve the aforementioned object, a joining structure as a first aspect of the present invention includes a first plastic part composed of at least one thermoplastic resin of polyamide (PA), polybutylene terephthalate (PBT), polyacetal (POM), polyethylene terephthalate (PET), or polyphenylene sulfide (PPS), a second plastic part composed of at least high-density polyethylene (HDPE), and a metamorphic polyethylene layer that comes in contact with both the first plastic part and the second plastic part for joining the first plastic part and the second plastic part.

The joining property between such a resin as high-density polyethylene (HDPE) and other resins including polyamide (PA), polybutylene terephthalate (PBT), polyacetal (POM), polyethylene terephthalate (PET), or polyphenylene sulfide (PPS) is not particularly good. However, a joined state and airtightness can be maintained stably for an extended period of time by joining the two members with a metamorphic polyethylene that exhibits an excellent joining property with both of the members.

DETAILED DESCRIPTION OF THE PREFERRED EMBODIMENTS

Embodiments of the present invention will hereinafter be described.

Referring to FIG. 1, the joining structure of plastic parts according to the present invention, as well as the structure according to related art will be described schematically.

Figure 1A:
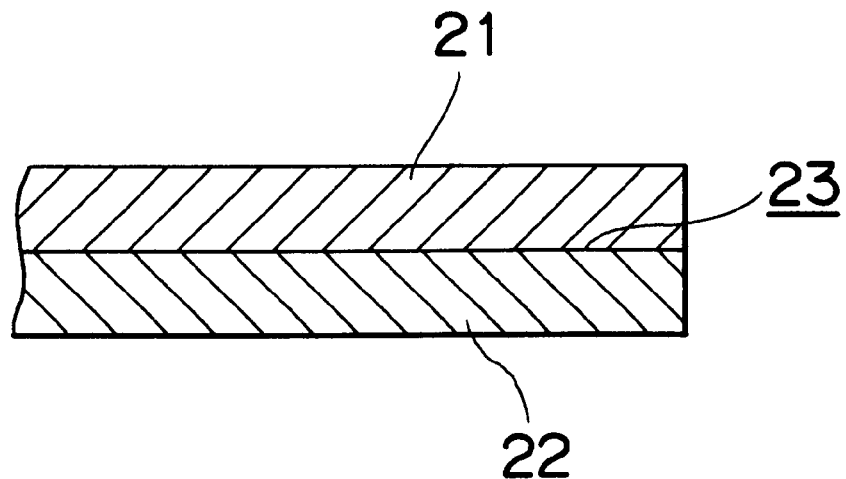
FIG. 1 is a schematic drawing of the joining structure according to the present invention.

As shown in FIG. 1A, in the joining structure of plastic parts according to the related art, a first plastic part 21 is composed of at least one of polyamide (PA)or polyacetal (POM), and a second plastic part 22 is composed of high-density polyethylene (HDPE). Furthermore, both parts 21 and 22 are joined by insert molding or the like.

Figure 1B:
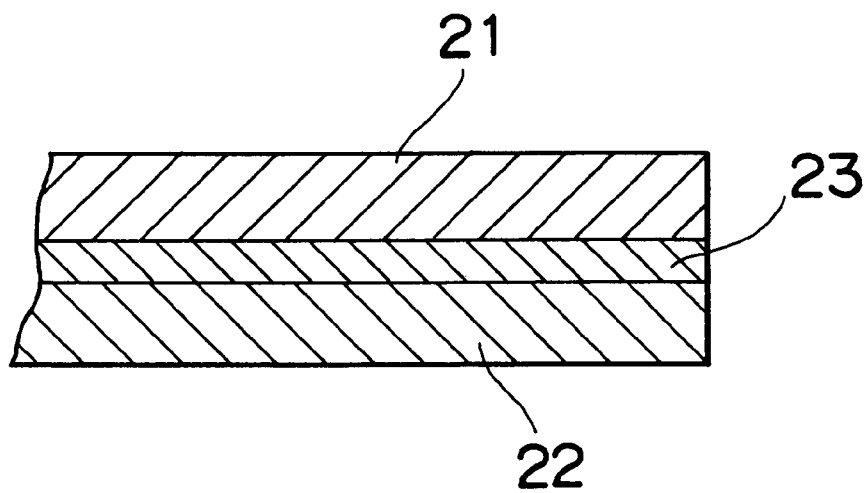

On the other hand, in the joining structure of the present invention as shown in FIG. 1B, the first plastic part 21 is composed of at least one of polyamide (PA), polybutylene terephthalate (PBT), polyacetal (POM), polyethylene terephthalate (PET), or polyphenylene sulfide (PPS) , while the second plastic part 22 is composed of high-density polyethylene (HDPE). In addition, a joining layer composed of the metamorphic polyethylene layer 23 is interposed between both parts 21 and 22.

According to the present invention, reliable joining is obtained with a good joining property with polyamide (PA), polybutylene terephthalate (PBT), polyacetal (POM), polyethylene terephthalate (PET), or polyphenylene sulfide (PPS) composing the first plastic part 21 and the metamorphic polyethylene layer 23.

Reliable joining is obtained also with a good joining property with high-density polyethylene (HDPE) composing the second plastic part 22 and the metamorphic polyethylene layer 23.

Figure 2:
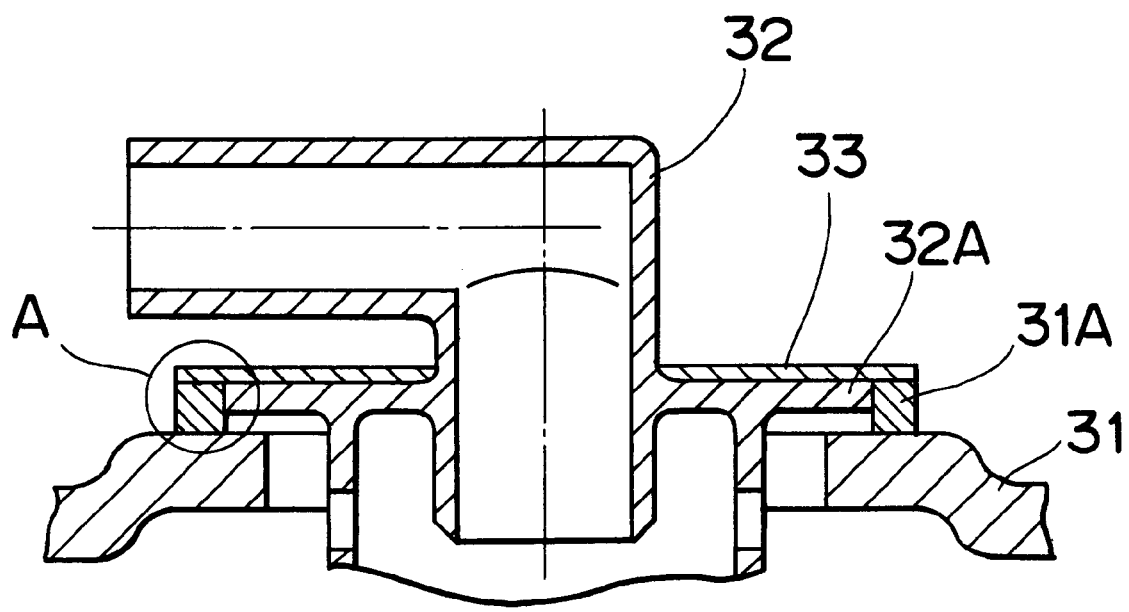
FIG. 2 is a sectional view showing a structure of an embodiment of the present invention, in which a plastic fuel cut valve is joined to a plastic fuel tank.

Referring to FIG. 2, another embodiment will hereinafter be described in which a plastic member is mounted to a plastic fuel tank.

A skin layer of a fuel tank 31 is composed of high-density polyethylene (HDPE), while a fuel cut valve is composed of polyamide (PA), polybutylene terephthalate (PBT), polyacetal (POM), polyethylene terephthalate (PET), or polyphenylene sulfide (PPS).

The fuel cut valve 32 is formed with a flange portion 32A to which a metamorphic polyethylene layer 33 is joined. In this case, with a good joining property between polyamide (PA), polybutylene terephthalate (PBT), polyacetal (POM), polyethylene terephthalate (PET), or polyphenylene sulfide (PPS) and the metamorphic polyethylene layer 33, a joined state is maintained stably for an extended period of time and airtightness is also maintained.

In addition, the fuel tank 31 is formed with a mounting portion 31A which is composed of high-density polyethylene (HDPE) just as is the fuel tank 31.

The metamorphic polyethylene layer 33 is joined to the mounting portion 31A. In this case, with good joining properties for high-density polyethylene (HDPE) and the metamorphic polyethylene, a joined state is maintained stably for an extended period of time and airtightness is also maintained.

The present invention is not limited to the aforementioned embodiments and can include other embodiments.

For example, in the case mentioned above, a fuel cut valve is joined to the fuel tank; however, an onboard refueling vapor recovery valve or another valve that can be assembled to the fuel tank may be used instead.

The present invention is not limited to the joining of a fuel tank and a mounting member, and can include a joining structure of plastic pipes.

Figure 3A:
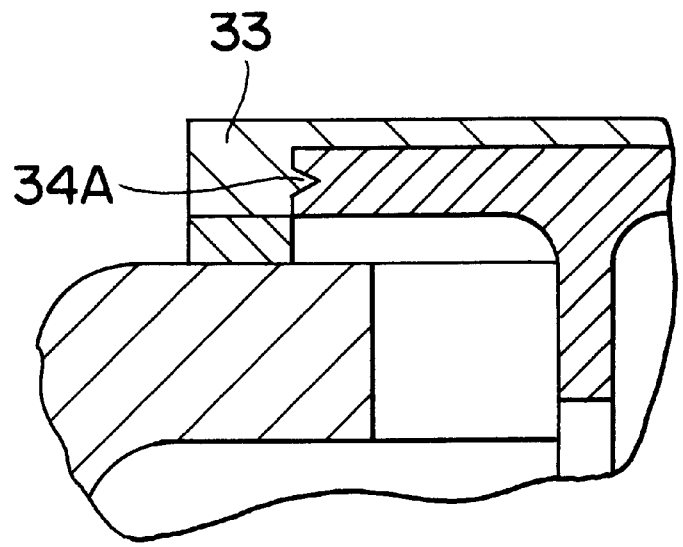
FIGS. 3A and 3B are sectional views showing a structure for preventing the valve from coming off at the joined portion according to the present invention.
Figure 3B:
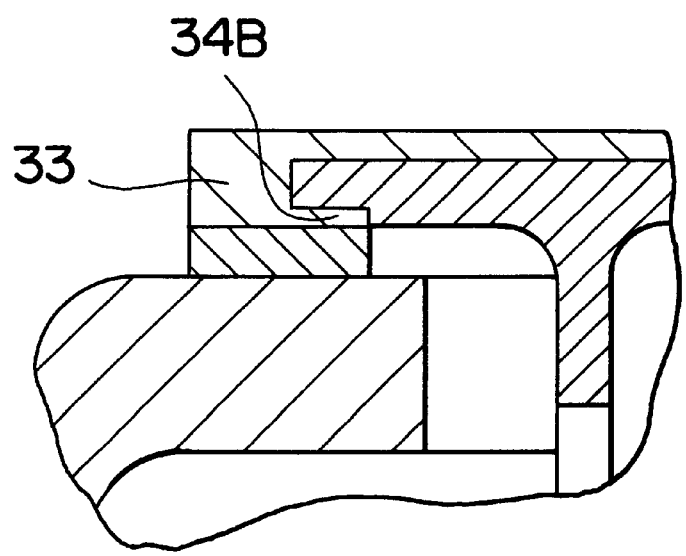

In addition to the aforementioned embodiments, the present invention can be also be structured as shown in FIGS. 3A and 3B.

Namely, as shown in FIGS. 3A and 3B, a recessed portion 34A or a protruding portion 34B is provided on a plastic part on one side. The recessed portion 34A or protruding portion 34B is joined to the metamorphic polyethylene layer 33 (by insert molding or the like) to improve the joining property and airtightness. At the same time, the performance for preventing the part from coming off can be improved. The number of recessed portions 34A or protruding portions 34B is not determined in particular, that is, the recessed portion 34A or protruding portion 34B may be a single circular groove (or a projection) or a plurality of circular grooves (or projections). As for the shape of the projection, in addition to a rectangular shape or sawtooth shown in the figures, various other shapes may be employed. Furthermore, the recessed portion 34A or protruding portion 34B may be made a groove or projection formed at an area (locally) rather than an elongated circular groove or projection.

Figure 4:
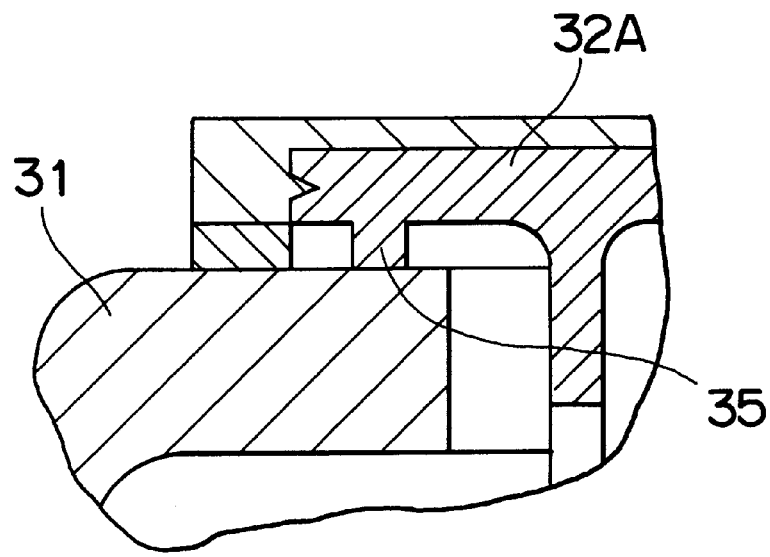
FIG. 4 is a sectional view showing an indexing mechanism at the joined portion according to the present invention.

As shown in FIG. 4, a stopper 35 may be provided to the plastic part on the one side (the flange portion 32A of the fuel cut valve 32) to extend toward the plastic part on the other side (the fuel tank 31). By abutting the stopper 35 against the plastic part on the other side (the fuel tank 31), indexing of the joined position when joined is made easier, thus joining operation becomes easier.

Figure 5:
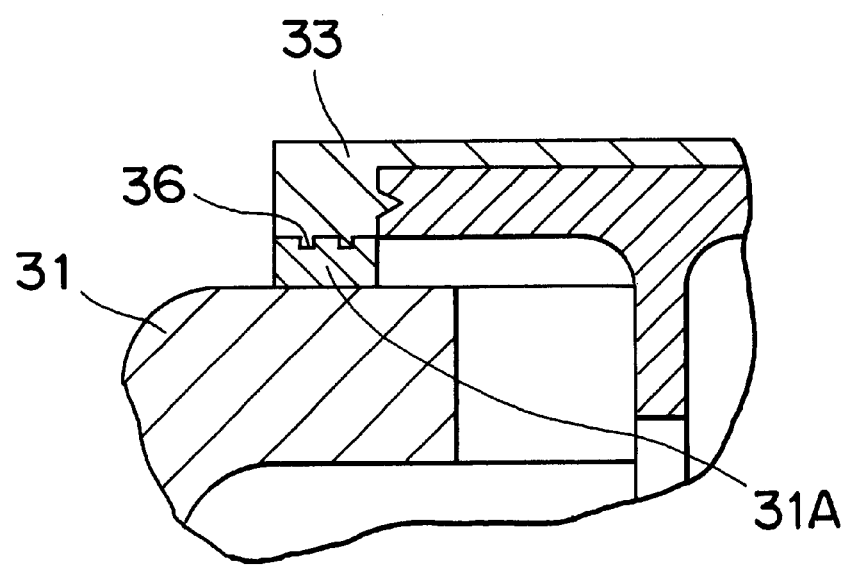
FIG. 5 is a sectional view showing an structure that improves airtightness of the joined portion according to the present invention.
Figure 6:
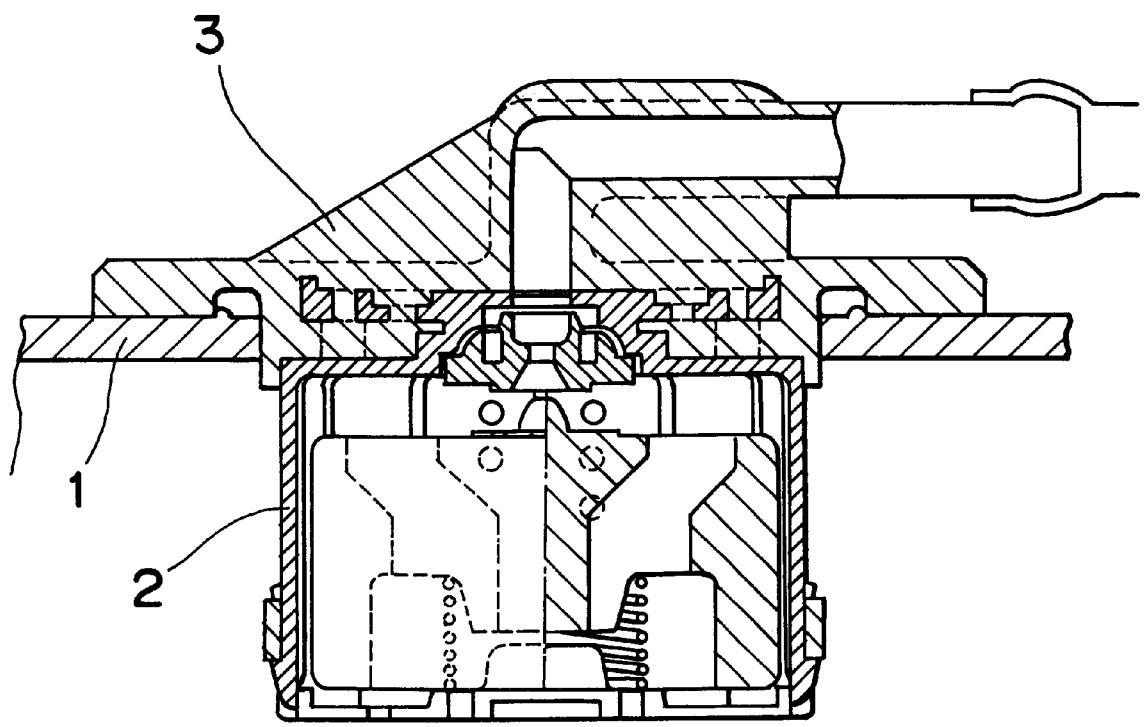
FIG. 6 is a sectional view showing the joined state of a plastic fuel tank and a fuel cut valve as a related art of the present invention.
Figure 7:
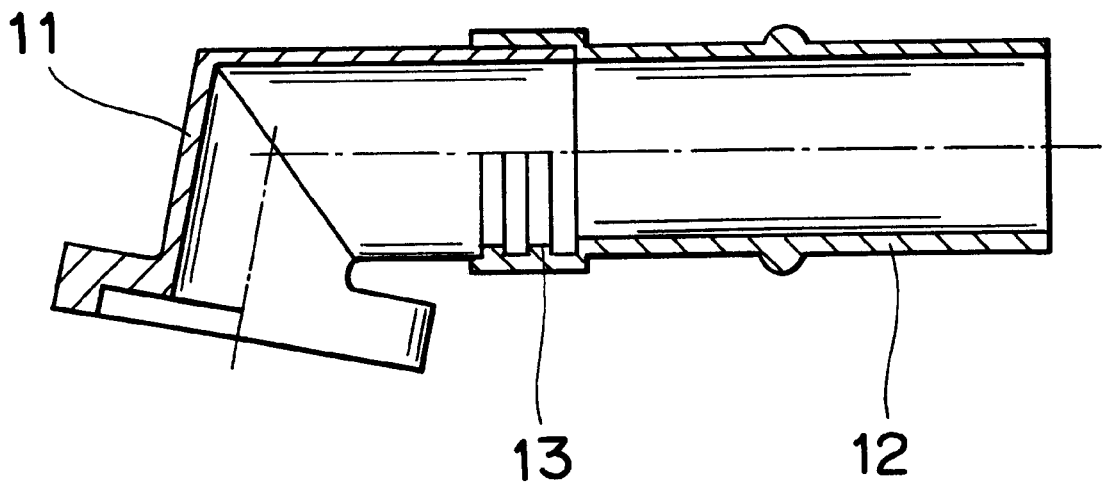
FIG. 7 is a sectional view showing the joined state of plastic pipes as another related art of the present invention.

Furthermore, as shown in FIG. 5, a recessed-protruding portion 36 may be provided on the plastic part on the other side (the mounting member 31A of the fuel tank 31) or the metamorphic polyethylene layer 33. By joining the recessed-protruding portion 36 at an area (by insert molding or the like), the joining property and airtightness can be improved together with the performance for preventing the part from coming off. In this case as well, the number of the recessed-protruding portions 36 is not determined in particular. For example, the recessed-protruding portion 36 may be a single circular groove (or a projection) or a plurality of circular grooves (or projections). As for the shape of the projection, various shapes may be employed, such as a saw-tooth shaped projection, in addition to the rectangular projection or groove as shown in the figure. Furthermore, the recessed-protruding portion 36 may be made a groove or projection formed at an area (locally) rather than an elongated circular groove or projection.

What is claimed is:

1. A joining structure comprising:
    a first plastic part composed of at least one thermoplastic resin of polyamide (PA), polybutylene terephthalate (PBT), polyacetal (POM), polyethylene terephthalate (PET), or polyphenylene sulfide (PPS);
    a second plastic part composed of at least high-density polyethylene (HDPE);
    a metamorphic polyethylene layer that comes in contact with both the first plastic part and the second plastic part, for joining the first plastic part and the second plastic part;
    wherein the first plastic part is at least a part of a fuel cutoff valve casing, and the second plastic part is at least a part of a mounting portion of a plastic fuel tank.

2. A joining structure comprising:
    a first plastic part composed of at least one thermoplastic resin of polyamide (PA), polybutylene terephthalate (PBT), polyacetal (POM), polyethylene terephthalate (PET), or polyphenylene sulfide (PPS);
    a second plastic part composed of at least high-density polyethylene (HDPE);
    a metamorphic polyethylene layer that comes in contact with both the first plastic part and the second plastic part, for joining the first plastic part and the second plastic part;
    wherein the first plastic part is at least a part of an onboard refueling vapor recovery valve casing, and the second plastic part is at least a part of the mounting portion of a plastic fuel tank.

3. A joining structure comprising:
    a first plastic part composed of at least one thermoplastic resin of polyamide (PA), polybutylene terephthalate (PBT), polyacetal (POM), polyethylene terephthalate (PET), or polyphenylene sulfide (PPS);
    a second plastic part composed of at least high-density polyethylene (HDPE);
    a metamorphic polyethylene layer that comes in contact with both the first plastic part and the second plastic part, for joining the first plastic part and the second plastic part; and
    a stopper;
    wherein the first plastic part includes the stopper, the stopper extending toward the second plastic part, and the end portion of the stopper abuts against the second plastic part upon joining of the first plastic part and the second plastic part.

* * * * *